United States Patent [19]

Hall et al.

[11] Patent Number: 5,527,599
[45] Date of Patent: Jun. 18, 1996

[54] NON-ASBESTOS FLEXIBLE SHEET MATERIAL

[75] Inventors: David G. Hall, Royton; Jonathan R. Kennerley, Rochdale, both of England

[73] Assignee: T&N Technology Limited, Rugby, England

[21] Appl. No.: 129,177

[22] PCT Filed: Mar. 23, 1992

[86] PCT No.: PCT/GB92/00520

§ 371 Date: May 24, 1994

§ 102(e) Date: May 24, 1994

[87] PCT Pub. No.: WO92/17418

PCT Pub. Date: Oct. 15, 1992

[30] Foreign Application Priority Data

Apr. 2, 1991 [GB] United Kingdom ............... 9106806

[51] Int. Cl.⁶ .............................. F16J 15/00; B05D 3/02; B32B 3/06
[52] U.S. Cl. ............... 428/283; 277/277; 277/235 R; 277/235 B; 427/372.2; 427/385.5; 427/387; 427/389.8; 428/290; 428/307.7; 428/311.1; 428/311.5; 428/319.1; 428/319.7; 428/320.2; 428/426; 428/432; 428/450; 428/454; 428/461; 428/463; 428/500
[58] Field of Search ................. 428/290, 450, 428/432, 441, 442, 426, 454, 461, 306.6, 307.3, 308.4, 228, 268, 273, 463, 283, 311.1, 311.5, 318.6, 319.1, 319.3, 319.7, 320.2, 500; 427/389.8, 372.2, 389.7, 180, 387, 201, 385.5; 156/324.4, 309.9; 277/227, 235 B, 235 R

[56] References Cited

U.S. PATENT DOCUMENTS

| | | | |
|---|---|---|---|
| 2,360,830 | 10/1944 | Denman | 288/33 |
| 3,914,490 | 10/1975 | Fusiek | 428/133 |
| 4,786,670 | 11/1988 | Tracy et al. | 524/34 |

FOREIGN PATENT DOCUMENTS

| | | |
|---|---|---|
| 0077444 | 4/1983 | European Pat. Off. . |
| 0166376 | 1/1986 | European Pat. Off. . |
| 63-293364 | 11/1988 | Japan . |
| 8500036 | 1/1985 | WIPO . |

*Primary Examiner*—Paul J. Thibodeau
*Assistant Examiner*—Stephen Sand
*Attorney, Agent, or Firm*—Synnestvedt & Lechner

[57] ABSTRACT

Non-asbestos flexible sheet material suitable for use in gaskets (e.g., automobile exhaust manifold gaskets) operating at high temperature (e.g., 500°–700° C.) is made by impregnating a non-woven tissue of glass or like fiber stable at 700° C. with an aqueous slurry of inorganic filler, particularly a clay, said aqueous slurry including a dispersed elastomeric binder (e.g., an acrylic) and a dispersed or dissolved binder (e.g., colloidal silica) which is essentially inorganic and is effective above 300° C. The impregnated tissue is then dried.

11 Claims, No Drawings

NON-ASBESTOS FLEXIBLE SHEET MATERIAL

FIELD OF THE INVENTION

This invention relates to non-asbestos flexible sheet material suitable for use in gaskets operating at high temperature, such as those for the exhaust manifold of an internal combustion engine.

DESCRIPTION OF THE PRIOR ART

Flexible sheet material having a basis of asbestos is made of fibers of asbestos bound together with a binder (often starch) and is made with the use of conventional papermaking machinery such as a Fourdrinier machine. In the manufacture of exhaust manifold gaskets, asbestos paper is drawn from a reel and, with a sheet of the metal (e.g. tinplate) which is to form the support element of the gasket, is passed between rollers which urge the two sheets into engagement with one another, as by pushing shallow tangs on the metal sheet into the paper. Additionally, before passage of the sheets between the rollers, adhesive may be applied to the metal sheet or to the paper to improve bonding after engagement. From the composite sheet thus formed blanks are cut in the desired shape. Composite sheet as just described is usually made in three forms: single-sided (one layer of metal support, and one layer of paper); double-sided paper; and double-sided metal. The paper employed is ordinarily made so that it will serve for all three forms of gasket.

SUMMARY OF THE INVENTION

The present invention is concerned to provide flexible sheet material not having a basis of asbestos, but with the properties required for use in exhaust manifold and like gaskets, and in particular the flexibility and tensile strength to withstand being made up into gaskets without losing its integrity, the ability to withstand temperatures of 500°–700° C., and the ability to retain its sealing capacity despite the constant fluctuations in temperature to which it may be subjected in use.

It is already known, e.g. from our GB 2 138 854 A, to make such non-asbestos flexible sheet material by a papermaking procedure. We now provide an alternative process, which utilizes non-woven web of glass (such as is now commercially available for the manufacture of glass-reinforced plastic articles) or like fiber stable at 700° C.

The method of the invention can be employed to produce composite sheet having a sealing performance superior to that of sheet utilizing a non-asbestos paper, as in its better stress-retention under clamping bolt pressure or its improved resistance to loss of integrity during prolonged use.

DETAILED DESCRIPTION OF THE PREFERRED EMBODIMENT

The invention provides a method of making non-asbestos flexible sheet material suitable for use in gaskets operating at high temperature, in which a non-woven web of inorganic fibers stable at 700° C. is impregnated with an aqueous slurry of inorganic filler, said aqueous slurry including a dispersed elastomeric binder and a dispersed or dissolved binder which is essentially inorganic and is effective above 300° C.; and the impregnated web is then dried.

The inorganic fibre may be mineral or carbon fiber, but is preferably glass fiber.

The inorganic filler is the major weight component of the slurry, and may be chosen from materials commonly used in papermaking e.g. barytes, mica, talc, limestone. A mixture of materials may be used. Preferably the inorganic filler is predominantly a clay, such as ball clay, china clay or calcined china clay, for clays help to confer a desirable thixotropy which makes for stability and homogeneity in the slurry, with the suspended solids showing little tendency to settle out, and enables a smooth surface finish to be readily obtained on the impregnated web.

The elastomeric binder which is dispersed in the aqueous slurry provides flexibility and compressibility in the sheet material produced, and acts as a binder at temperatures up to about 300° C. It is, of course, an ingredient which is useful in the manufacture stage but quickly becomes destroyed when the gasket product is used at temperatures of 500°–700° C. Suitable elastomers are of the acrylic or nitrile butadiene rubber type, but any elastomer is conveniently used which is available in latex form.

The inorganic binder which is dispersed or dissolved in the aqueous slurry maintains the integrity of the material after the elastomeric binder has burnt off when the gasket product is exposed to operating temperatures. It is preferably a silica-type binder, such as colloidal silica or tetraethoxysilane, $Si(OC_2H_5)_4$, whose ethoxy groups readily hydrolyse off and leave silica as the essential binding component. An alkali metal silicate, suitably sodium silicate, may also be employed as inorganic binder.

Preferred dry weight proportions of the ingredients of the aqueous impregnating slurry are:

|  | % by weight |
| --- | --- |
| Inorganic filler | 75–95 |
| Inorganic binder | 1–15 |
| Elastomeric binder | 1–12, especially 1–10 |

The invention further illustrated by the following Examples.

EXAMPLE 1

This example describes the manufacture of non-asbestos flexible sheet material from a commercially available non-woven glass fiber web and an aqueous slurry of the composition

|  | % by dry weight |
| --- | --- |
| Mineral filler (calcined china clay) | 88.43 |
| Inorganic binder (silica type) | 5.54 |
| Elastomeric binder (an acrylic) | 5.43 |
| Pigment (carbon black) | 0.60 |

An aqueous colloidal dispersion of silica (Nalfloc 1030, 3.3 kg; 30% by weight $SiO_2$; pH 9.9; $Na_2O$ content, 0.5%) was added to water (5.82 kg) in a vessel equipped with a stirrer, and a dispersing agent (Dispex® N40 of Allied Colloids; a sodium polycarboxylate; pH 7–7.5; 5 ml, active content 40% by weight) was added to the mixture. Calcined china clay (15 kg; at least 50% by weight of particle size below 2 µm; specific surface area, 12 $m^2$/gram; moisture content, 0.5% max) was then stirred in over a period of 20 minutes, with increase of stirrer speed as the slurry formed on addition became more viscous. To impart thixotropy aqueous sodium carbonate solution (10% by weight Na$_2$CO$_3$; 1.58 kg) was added to the slurry followed by a further quantity of calcined china clay (0.8 kg).

An elastomeric binder was incorporated in the slurry by adding to it an aqueous dispersion (2.18 kg) of an acrylic rubber in the form of a commercially available latex (Revacryl 272; 45.5% solids content), being an emulsion of a self cross-linking acrylic copolymer; pH 4; particle size 0.2 µm; glass transition temperature Tg of dry film, −44° C.

An aqueous carbon black dispersion (Croda Forthsperse® black; 0.36 kg; 30% solids) was added, and the mixture was given a final 5 minutes stirring at high speed to ensure homogeneity.

The slurry resulting from the above procedure was thixotropic, and was employed as impregnant for a commercially available non-woven glass fiber web (weight per unit area= 100 grams/m$^2$) made by a wet laying process from E-glass fibers of length 18 mm and diameter 13 µm, the bonding agent being a urea formaldehyde resin, forming about 10% by weight of the web.

The glass web was unwound from a roll and passed through a bath of the slurry, excess of which was removed from the surface of the impregnated web by feeding it through the gap (0.7 mm wide) between two horizontally disposed steel bars of diameter 19 mm. (Passage between the nip of a pair of rollers is an effective alternative.)The impregnated tissue was then dried by passage through a hot-air dryer at 100° C.

The flexible sheet material thus obtained had mass/unit area 710 grams/m$^2$, thickness 0.7 mm, and compression (ASTM F806) 35% under a stress of 34.5 MPa.

The material was applied to each side of a tanged steel support sheet coated with heat-activatable adhesive, and the resulting sandwich was fed between heated rollers. Automotive exhaust gaskets of the desired shape and aperture were then stamped from the composite sheet thus formed.

EXAMPLE 2

Following generally the procedure of Example 1 glass web of weight per unit area 102 grams/m$^2$ was impregnated with a slurry having the following composition:

|  | % by dry weight |
| --- | --- |
| Calcined china clay | 83.1 |
| Colloidal silica | 5.6 |
| Acrylic latex | 11.3 |

Sheets of the glass web were soaked in a bath of the slurry and passed between two bars having a separation of 0.78 mm. The impregnated sheets were then dried and found to have the following properties:

| Thickness | 0.78 mm |
| --- | --- |
| Mass/unit area | 765 grams/m$^2$ |
| Compression at 34.5 MPa | 32.3% |
| Cross-grain tensile strength | 12.8 MPa |

The tensile strength of the flexible sheet material was also measured following exposure to high temperature for a period of 5 hours, and the following results obtained:

| Test temperature | Cross-grain tensile strength |
| --- | --- |
| 300° C. | 9.3 MPa |

-continued

| Test temperature | Cross-grain tensile strength |
| --- | --- |
| 500° C. | 4.4 MPa |
| 700° C. | 2.8 MPa |

The tensile strength of a conventional cellulose-based paper gasket material was not measurable in the above tests because the material was too fragile to be handled.

In addition the stress relaxation behavior of the flexible sheet material was measured by a similar method to that described in ASTM F1278, using an annular specimen of internal diameter 14.7 mm and external diameter 34.5 mm. The test rigs were machined from a nickel-chromium alloy (Nimonic) to allow the test to be performed at high temperature. An initial stress of 20 MPa was applied to the specimen and the residual stress was measured after exposure to a temperature of 500° C. for periods of 16 and 69 hours. The loss in stress as a percentage of the .initial stress was 49% in each case. By contrast, a conventional cellulose-based paper gasket material had a high stress relaxation (91%).

EXAMPLE 3

Following generally the procedure of Example 1 glass web of weight per unit area 70 grams/m$^2$ was impregnated with a slurry having the following composition:

|  | % by dry weight |
| --- | --- |
| Calcined china clay | 88.8 |
| Colloidal silica | 5.6 |
| Acrylic latex | 5.6 |

Addition of sodium carbonate was omitted from the mixing procedure, to form a lower-viscosity slurry which did not have the thixotropic properties of that in Example 1. Satisfactory impregnation was still achhieved, and after drying the impregnated web was passed through the nip of a calender. The resulting sheet material had the following properties

| Thickness | 0.62 mm |
| --- | --- |
| Mass/unit area | 612 grams/m$^2$ |
| Compression at 34.5 MPa | 26.7% |
| Stress relaxation | 38% (16 hours at 500° C.) |

In the above Examples, impregnation of the non-woven web of inorganic fibres is carried out by immersing the web in the aqueous slurry of inorganic filler. Other methods of impregnation can be employed, for example: application of the slurry to the web in air, followed by removal of excess slurry, as in knife-over-roller coating.

We claim:

1. A method of making non-asbestos flexible sheet material for use in gaskets operating at temperatures of 500°–700° C. comprising providing a non-woven web of fibers which consist of an inorganic, non-asbestos material stable at 700° C., impregnating the web with an aqueous slurry consisting of inorganic filler and a mixture of elastomeric binder and inorganic binder; and then drying the impregnated web.

2. A method according to claim 1, in which the non-woven web is of glass fiber.

3. A method according to claim 1 in which the inorganic filler is a clay.

4. A method according to claim 3, in which the clay is selected from the group consisting of ball clay, china clay and calcined china clay, 5. A method according to claim 1 in which the elastomeric binder is an acrylic elastomer.

6. A method according to claim 1 in which the elastomeric binder is a nitrile butadiene rubber.

7. A method according to claim 1 in which the inorganic binder is a silica binder.

8. A method according to claim 7, in which said inorganic binder is in the form of colloidal silica.

9. A method of making non-asbestos flexible sheet material suitable for use in gaskets operating at temperatures of 500°–700° C., in which a non-woven web of inorganic non-asbestos fibers stable at 700° C. is impregnated with an aqueous slurry consisting of 75–95 dry wt % of inorganic filler, from 1–12 dry wt % of a dispersed elastomeric binder and from 1–15 dry wt % of a dispersed or dissolved inorganic binder, and then drying the impregnated web.

10. Non-asbestos flexible sheet material of inorganic fibers made in accordance with claim 1.

11. An automobile exhaust manifold gasket comprising a metal support and, bonded to it, a facing of non-asbestos flexible sheet material of inorganic fibers according to claim 10.

* * * * *

UNITED STATES PATENT AND TRADEMARK OFFICE
CERTIFICATE OF CORRECTION

PATENT NO. : 5,527,599
DATED : June 18, 1996
INVENTOR(S) : Hall et al

It is certified that error appears in the above-indentified patent and that said Letters Patent is hereby corrected as shown below:

Column 3, line 26, change "tissue" to --web--

Column 4, line 12, change "F1278" to --F1276--

Signed and Sealed this

Eighteenth Day of February, 1997

Attest:

BRUCE LEHMAN

Attesting Officer  Commissioner of Patents and Trademarks